(No Model.)
W. A. WALKER.
MEANS FOR EQUALIZING THE PRESSURE OF GAS IN GAS SERVICE PIPES.
No. 455,913. Patented July 14, 1891.
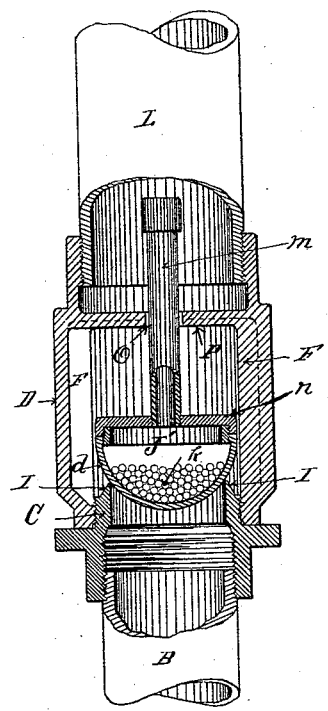
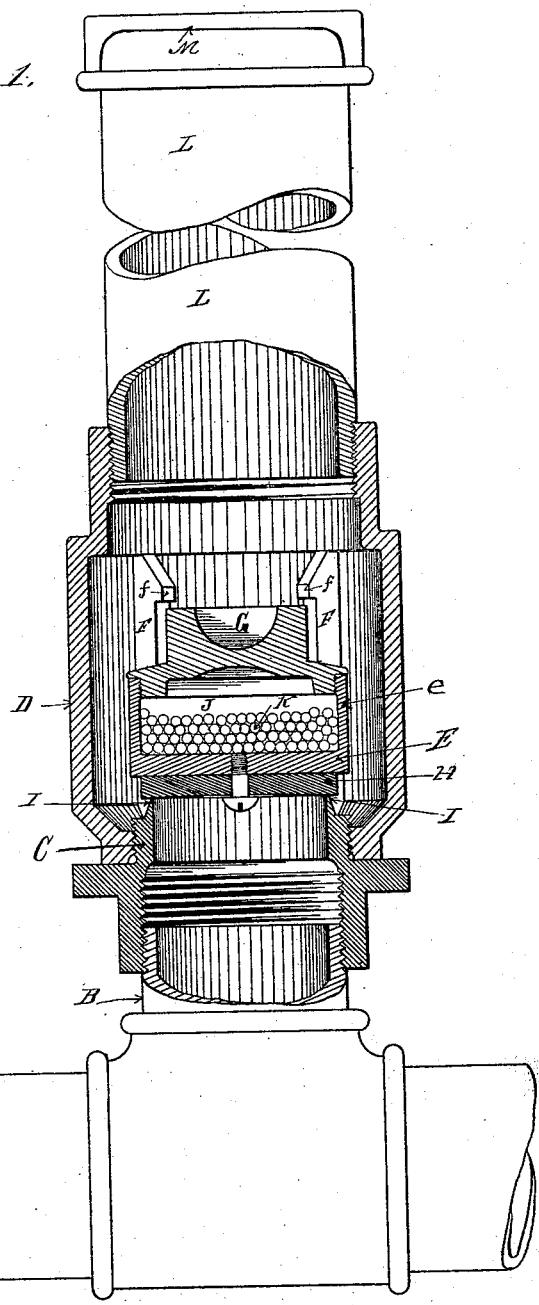
WITNESSES
INVENTOR
William A. Walker
By
Atty.

UNITED STATES PATENT OFFICE.

WILLIAM A. WALKER, OF ERIE, PENNSYLVANIA.

MEANS FOR EQUALIZING THE PRESSURE OF GAS IN GAS SERVICE-PIPES.

SPECIFICATION forming part of Letters Patent No. 455,913, dated July 14, 1891.

Application filed January 2, 1891. Serial No. 376,488. (No model.)

*To all whom it may concern:*

Be it known that I, WILLIAM A. WALKER, a citizen of the United States, residing at Erie, in the county of Erie and State of Pennsylvania, have invented certain new and useful Improvements in Means for Equalizing the Pressure of Gas in Gas Service-Pipes; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in means for equalizing the pressure in gas service-pipes, hereinafter set forth and explained, and illustrated in the accompanying drawings, in which—

Figure 1 is a view, partially in section and partially in elevation, of my improved system and mechanism for equalizing the pressure of gas in service-pipes. Fig. 2 is a vertical central section of an alternate form of construction of the valve mechanism used in my device.

In the construction of my device shown in the drawings, A is a gas service-pipe, and B a pipe extending upward therefrom at a street corner or other convenient place. To the pipe B, I couple a valve-seat C, to which is secured a valve-shell D, within which a gravity-valve E operates in vertical guides F, which are provided with stops $f$ at their upper ends to prevent the valve E from being raised too far.

The valve E, I preferably make in the shape of a hollow shell $e$, having a screw-cap G for closing the upper end thereof, so as to form a chamber J therein. On the outside of the bottom of the valve-shell I secure a disk of soft rubber packing H, which contacts with the top I of the valve-seat when the valve is closed. The top I of the valve-seat I make preferably in the shape of a thin, somewhat sharp, edge, so that obstructions in the shape of dirt or scale carried upward from the inside of the service-pipe by the gas escaping through the valve will not lodge thereon and prevent the proper seating of the valve, and also for the purpose of having the soft-rubber face H of the valve seat thereon perfectly at a very slight pressure.

The chamber J of the valve E is for the purpose of enabling the weight of the valve E to be adjusted by placing fine mustard-seed bird-shot K therein until the weight of the valve is so adjusted that the valve E will remain seated; but when any excess pressure of gas occurs in the service-pipe the valve E is at once raised by such excess pressure and allows the surplus gas to escape until the normal pressure is restored in the service-pipe, when the valve automatically closes.

To the top of the valve shell or case D, I preferably secure a pipe L, which projects up some distance into the air, where it is provided with a hood M to prevent rain and snow from falling into the pipe L and passing down to the valve E.

I place these devices at street corners and connect them with the gas service-pipes at such intervals as will insure the escape of any surplus pressure of gas, and thereby effectually prevent any danger from fire from an excessive pressure and flow of gas—a matter of frequent occurrence when natural gas is used for fuel. The regulation of the pressure and flow of gas through the service-pipes has been heretofore a matter of extreme difficulty and a matter requiring careful and constant attention.

In Fig. 2 I show an alternate form of construction of the valve mechanism of my device. In this construction the valve-seat C is the same in construction as that hereinbefore described; but the valve E', I make of a hollow hemisphere of rubber $d$, which is secured to a circular plate $n$, forming the top of the valve. To the center of the plate $n$ is a hollow stem $m$, which projects up through a central hole O in a spider P, secured to the valve-shell D. Ribs F on the inside of the shell D are also provided as guides, against which edges of the plate $n$ contact, which, together with the stem $m$, operating through the hole O in the spider P, form guides in which the valve E' operates. I also load this valve E' by placing fine bird-shot $k$ in the chamber J' therein to adjust the weight of the valve to the gas-pressure, as hereinbefore described.

In practice either of the forms of valve operate successfully in my device.

Having thus described my device so as to enable others to construct and use the same, what I desire to secure by Letters Patent of the United States is—

The combination, in a valve for equalizing the pressure in gas service-pipes, of a valve-shell, as D, valve-guides in said shell, and an upwardly-projecting narrow annular valve-seat I in the lower part of said shell, with a valve having a soft-rubber face thereon and a chamber therein adapted to receive material for adjustably weighting said valve, operating vertically in said valve-guides and seating upon said narrow annular valve-seat I, substantially as and for the purpose set forth.

In testimony whereof I affix my signature in presence of two witnesses.

WILLIAM A. WALKER.

Witnesses:
H. J. CURTZE,
J. C. OSBORNE.